(12) United States Patent
Care et al.

(10) Patent No.: US 9,850,764 B2
(45) Date of Patent: Dec. 26, 2017

(54) BLADE TIP

(71) Applicant: ROLLS-ROYCE PLC, London (GB)

(72) Inventors: Ian Colin Deuchar Care, Derby (GB); Stephane Baralon, Derby (GB)

(73) Assignee: ROLLS-ROYCE plc, London (GB)

( * ) Notice: Subject to any disclaimer, the term of this patent is extended or adjusted under 35 U.S.C. 154(b) by 351 days.

(21) Appl. No.: 14/613,744

(22) Filed: Feb. 4, 2015

(65) Prior Publication Data
US 2015/0247411 A1 Sep. 3, 2015

(30) Foreign Application Priority Data
Feb. 28, 2014 (GB) .................................. 1403588.5

(51) Int. Cl.
| | |
|---|---|
| *F01D 5/14* | (2006.01) |
| *F01D 5/20* | (2006.01) |
| *F01D 5/28* | (2006.01) |
| *F04D 29/02* | (2006.01) |
| *F04D 29/32* | (2006.01) |
| *B23P 15/04* | (2006.01) |

(52) U.S. Cl.
CPC .............. *F01D 5/20* (2013.01); *B23P 15/04* (2013.01); *F01D 5/147* (2013.01); *F01D 5/282* (2013.01); *F04D 29/023* (2013.01); *F04D 29/324* (2013.01); *F05D 2210/33* (2013.01); *F05D 2220/36* (2013.01); *F05D 2240/307* (2013.01); *F05D 2300/603* (2013.01); *F05D 2300/6032* (2013.01); *F05D 2300/612* (2013.01); *F05D 2300/614* (2013.01); *Y10T 29/49337* (2015.01); *Y10T 29/49339* (2015.01)

(58) Field of Classification Search
CPC ......... F05D 2300/603; F05D 2300/612; F01D 5/282; F01D 5/147; F04D 29/324; F04D 29/023
See application file for complete search history.

(56) References Cited

U.S. PATENT DOCUMENTS

| | | | |
|---|---|---|---|
| 3,694,325 A | 9/1972 | Katz et al. | |
| 3,758,234 A * | 9/1973 | Goodwin | ................ F01D 5/282 416/230 |
| 4,375,233 A * | 3/1983 | Rossmann | ................ B22C 9/04 164/35 |
| 4,689,242 A | 8/1987 | Pike | |

(Continued)

FOREIGN PATENT DOCUMENTS

| | | |
|---|---|---|
| CN | 101255800 A | 9/2008 |
| CN | 201635775 U | 11/2010 |

(Continued)

OTHER PUBLICATIONS

Oct. 10, 2014 Search Report issued in British Application No. 1403588.5.

(Continued)

*Primary Examiner* — Umashankar Venkatesan
(74) *Attorney, Agent, or Firm* — Oliff PLC (57) ABSTRACT

There is provided a blade tip for a rotary blade. The blade tip is formed of a metal foam and comprises at least one vortex generator. The vortex generator may comprise at least one passageway and/or cavity in the blade tip. In use, a vortex is created between the blade tip and a fan casing adjacent the blade tip.

18 Claims, 6 Drawing Sheets

(56) References Cited

U.S. PATENT DOCUMENTS

| | | |
|---|---|---|
| 5,059,095 A | 10/1991 | Kushner et al. |
| 5,355,637 A | 10/1994 | Wiltshire et al. |
| 5,551,840 A | 9/1996 | Benoit et al. |
| 5,609,779 A * | 3/1997 | Crow ................. B23K 26/0622 219/121.71 |
| 5,704,759 A | 1/1998 | Draskovich et al. |
| 5,952,110 A | 9/1999 | Schell et al. |
| 6,190,124 B1 | 2/2001 | Freling et al. |
| 6,287,075 B1 * | 9/2001 | Kercher ................. F01D 5/186 415/115 |
| 6,755,619 B1 | 6/2004 | Grylls et al. |
| 7,186,085 B2 * | 3/2007 | Lee ........................ F01D 5/186 416/97 R |
| 7,510,370 B2 | 3/2009 | Strangman et al. |
| 7,780,420 B1 | 8/2010 | Matheny |
| 2003/0021684 A1 | 1/2003 | Downs et al. |
| 2003/0132119 A1 | 7/2003 | Ohara et al. |
| 2005/0129511 A1 | 6/2005 | Allen |
| 2006/0171813 A1 | 8/2006 | Malak et al. |
| 2007/0059182 A1 | 3/2007 | Stegemiller et al. |
| 2010/0068032 A1 * | 3/2010 | Liang ..................... F01D 5/186 415/115 |
| 2010/0143103 A1 | 6/2010 | Sellars et al. |
| 2011/0123312 A1 * | 5/2011 | Venkataramanan .... F01D 5/186 415/115 |
| 2011/0311369 A1 * | 12/2011 | Ramachandran ....... F01D 5/186 416/97 R |
| 2012/0093634 A1 | 4/2012 | Liotta |
| 2013/0280049 A1 | 10/2013 | Fisk et al. |
| 2013/0302166 A1 | 11/2013 | Lee et al. |

FOREIGN PATENT DOCUMENTS

| | | |
|---|---|---|
| DE | 19824583 A1 | 12/1999 |
| EP | 0659978 A1 | 6/1995 |
| EP | 1344895 A2 | 9/2003 |
| EP | 1 860 084 A1 | 11/2007 |
| EP | 2778347 A1 | 9/2014 |
| GB | 2498704 A | 7/2013 |
| JP | 2001303904 A | 10/2001 |

OTHER PUBLICATIONS

Jul. 9, 2015 Search Report issued in European Application No. 15 15 3766.

* cited by examiner

Contours of Velocity of Magnitude (m/s)

BLADE TIP

CROSS-REFERENCE TO RELATED APPLICATIONS

This application is based upon and claims the benefit of priority from British Patent Application Number 1403588.5 filed 28 Feb. 2014, the entire contents of which are incorporated by reference.

BACKGROUND

1. Field of the Disclosure

The present disclosure relates to a blade tip for a rotary blade e.g. a rotary blade for a gas turbine engine, and to a method of manufacturing a metal foam article such as a blade tip for a rotary blade.

2. Description of the Related Art

It is desirable to reduce the clearance between the tip of a rotary fan blade and the fan casing of a gas turbine engine in order to maximise fuel efficiency. Gas (air) leaking through the clearance gap rather than passing through the blades of the fan represents lost energy.

However, reducing the clearance between the fan blade tip and the fan casing can lead to undesirable rubbing of the fan blade tips on the fan casing during running engine conditions. The rubbing can cause blade damage both at the tip (resul0ting from the direct contact with the casing) and throughout the blade structure (resulting from stresses arising from vibrations and thermal damage arising from frictional heat caused by the rubbing). Furthermore abraded material can block cooling holes in the blade.

Various ways of reducing rubbing between the blade tips and fan casing during running conditions are known. For example, it is known to increase the clearance between the blade tip in their cold/static state and the fan casing to allow for dimensional changes in the blade tips during running. However, this reduces the turbine efficiency especially in the early stages of engine running.

It is known, for example from EP0659978A to effectively reduce the clearance between the blade tips and the fan casing during engine running by injecting internal cooling air into the gap between the blade tip and the fan casing or by channelling gas (air) from the pressure face of the blade through a curved passageway to the tip of the blade to create a buffer zone to prevent gas (air) from leaking through the clearance gap. The curved passageways are formed by drilling methods such as electrochemical milling or laser beam drilling.

Another known way for attempting to reduce rubbing under normal rubbing conditions is to provide a track liner on the interior surface of the fan casing to provide a shroud for the fan blade tips. The track liner may be formed of an abradable material (e.g. an epoxy resin) which is abraded by the rotary fan blades to form channels in the track liner into which the fan blade tips extend. These abradable track liners have found some success with metallic fan blades (e.g. titanium blades) which are very durable but a disadvantage of these track liners is that the running clearance is set by the longest blade. These track liners are not appropriate for use with fan blades formed of low temperature composite material (e.g. fibre-reinforced plastic material) which are less durable and can suffer blade tip damage.

Ablative fan casings are also known where the tip sections of the rotary fan blade are formed of an abradable material and are abraded by the fan casing during rubbing. Again, damage to the blade structure can occur as a result of uncontrolled vibrational and thermal energy arising during rubbing.

OBJECTS AND SUMMARY

There is a need for a blade tip for a rotary blade which reduces leakage of gas (air) through a clearance gap between the blade tip and an adjacent fan casing and which minimises blade damage from rubbing between the blade tip and fan casing during engine running.

In a first aspect, there is provided a blade tip for a rotary blade (such as a fan blade for a gas turbine engine), wherein the blade tip is formed of a metal foam and comprises at least one vortex generator comprising at least one passageway, such that, in use, a vortex is created between the blade tip and a fan casing adjacent the blade tip.

In use, the vortex generated by the vortex generator acts to prevent the passage of gas (air) through the clearance gap between the blade tip of the rotary blade and the adjacent casing (such as a fan casing) without having to reduce the physical gap between the blade tip and the fan casing and thereby reducing the chances of rubbing during running. By forming the blade tip of metal foam, in the event of rubbing between the blade tip and the fan casing e.g. in an extreme event such as a heavy gust or a bird strike, the metal foam blade tip will compress thus reducing the contact force between the blade tip and the fan casing which, in turn, reduces the transfer of vibrational and thermal energy from the blade tip to the blade body. The metal foam blade tip by nature of its structure will also provide a degree of vibrational damping and thus reduce transmittal of vibrational energy to the blade body. This, in turn, reduces the chances of structural and/or thermal damage to the blade body. Furthermore, a blade tip formed of metal foam has a reduced weight and thermal capacity compared to an analogous solid metal blade tip.

Optional features will now be set out. These are applicable singly or in any combination with any aspect.

A rotary blade typically comprises a blade body extending from a blade root to the radially opposed blade tip. The rotary blade comprises a leading edge and a trailing edge with a (typically concave) pressure surface and a (typically convex) suction surface extending between the two edges. The camber line extends from the leading edge to the trailing edge midway between the pressure and suction surfaces.

The vortex generator may comprise a cavity.

The vortex generator may be a passageway extending from an inlet on the pressure face of the blade tip to at least one outlet on the radially outer surface of the blade tip. The passageway may be a curved or spiral passageway. The passageway may be a funnelled passageway with the inlet having a greater cross-sectional area than the/each outlet. The outlet(s) of the passageway may be substantially midway between the pressure and suction surfaces i.e. on the camber line of the rotary blade. In other embodiments, the outlet(s) of the passageway may be substantially parallel to the camber line of the rotary blade e.g. towards the pressure surface. The outlet(s) may be slotted outlet(s). The slotted outlet(s) may be aligned with or substantially parallel to the camber line of the rotary blade. Where there is a plurality of outlets, the passageway is a branched passageway extending from a single inlet on the pressure face. The blade tip may have a plurality of passageways.

The vortex generator may be a chisel tip section having a chisel or wedge-shaped protrusion extending from the pressure surface of the blade tip. The radially outer surface of the blade tip may have a linear cut-back angle extending from the radially outer pressure surface edge to the radially outer suction surface edge or it may have a shaped or curved cut-back angle. The chisel or wedge-shaped protrusion may have a linear, sloped lower face (facing the blade root) or it may have a curved or scooped lower face.

The vortex generator may be a squealer tip section comprising a wall extending radially outwards around the perimeter of the radially outer surface of the blade tip and defining a central tip cavity. In some embodiments, the inner surface of the perimeter wall defining the central tip cavity are sloped or scooped. In some embodiments, the radially outer surface of the perimeter wall (especially towards the pressure surface) is convex.

The blade tip may comprise a plurality of vortex generators e.g. a chisel tip section and one or more passageways or a squealer tip section and one or more passageways.

For example, the vortex generator may comprise a squealer tip section comprising a wall extending radially outwards around the perimeter of the radially outer tip surface and defining a central tip cavity with at least one passageway extending from a respective inlet on the pressure face of the blade tip to at least one (e.g. two) respective outlet (s) in the central tip cavity.

In other examples, the vortex generator may comprise a chisel tip section having a chisel or wedge-shaped protrusion extending from the pressure surface of the blade tip with at least one passageway extending from a respective inlet on the pressure face of the blade tip to at least one respective outlet on the radial outer tip surface of the blade tip.

The metal foam may comprise aluminium, titanium, nickel, steel, or other metal foam.

The metal foam blade tip may comprise reinforcing fibres such as fibres formed of carbon, glass, aramid, metal, silicon carbide, boron or neoprene (or a mixture/combination of these). Carbon fibres may be glass coated or may be carbon fibre tow. The reinforcing fibres may extend from the metal foam blade tip.

In some embodiments, an ablative coating (such as a chopped fibre-reinforced/high temperature resin composite material or a polysulphide co-moulded in a glass fibre-reinforced Nomex® honeycomb structure) may be provided on the metal foam blade tip.

Alternatively, in some embodiments, a protective outer coating and/or an abrasive coating (such as a braze layer with embedded cubic boron nitride (CBN)) may be provided on the metal foam blade tip.

In some embodiments, the blade tip comprises an insulating material (e.g. infused into the metal foam, or as a discrete layer). The insulating material may be an elastomeric polymeric material. The insulating material may be a vibration insulating material (damping material) such as a thermoplastic elastomer (e.g. TPE-v or TPV) which may be mixed with a matrix material such as an epoxy resin. The insulation material may be a thermal insulation material such as a plastic-elastic urea polymer closed cell foam. This insulation material helps minimise transfer of vibrational or thermal energy to the blade body in the event of rubbing caused, for example, by an extreme event such a heavy gust or bird strike.

In a second aspect, there is provided a rotary blade having a blade tip according to the first aspect.

In some embodiments, the blade body of the rotary blade is formed of a composite material e.g. fibre-reinforced plastic material (such as carbon fibre in an epoxy resin matrix).

The metal foam blade tip may be bonded to the blade body using an adhesive e.g. a silicone elastomeric high temperature adhesive (such as Aremco® 2330) or a high temperature epoxy type resin. The metallic foam blade tip may be bonded to the blade body of a fibre-reinforced plastic composite blade by integrating any reinforcing fibres extending from the metal foam blade tip into the blade body e.g. by interweaving them with the composite fibres or by moulding them into the blade body. The fibres form part of the blade tip attachment and support mechanism.

In some embodiments, the rotary blade further comprises an insulating material positioned between the blade tip and the blade body. The insulating material may be a vibration insulating material (damping material) or a thermal insulation material as described above. In some embodiments, the insulating material is a foamed (or reticulating) adhesive.

In some embodiments, the pressure and suction surfaces the blade body of the rotary blade are provided with reinforcing facings (e.g. formed of titanium, stainless steel or nickel alloy). In some embodiments, the metal foam blade tip may be partly contained within the reinforcing facings. In some embodiments, the metal foam blade tip may partly contain the reinforcing facings e.g. within a metal foam sleeve which houses the radial outermost ends of the reinforcing facings.

In a third aspect, there is provided a rotary fan comprising a plurality of rotary blades according to the second aspect.

In a fourth aspect, there is provided a gas turbine engine comprising a rotary fan according to the third aspect.

In a fifth aspect, there is provided a method of making a metallic foam article comprising at least one passageway or cavity, said method comprising forming a metal foam around a shaping element, the shaping element being dimensioned and positioned to correspond to desired shape and position of the passageway or cavity in the article and, subsequently removing the shaping element from said metallic foam article.

Such a method can be used to form a metallic foam blade tip for a rotary blade having at least one vortex generator comprising a passageway or a squealer tip with a central cavity without the need for drilling.

In some embodiments, forming the metallic foam is carried out using the method described in GB201200034.5, the content of which is incorporated herein.

Accordingly, the method may comprise
a) constructing a pre-cursor comprising a plurality of beads secured to a fibre;
b) arranging a plurality of the precursors in a processing vessel around the shaping element, the shaping element being dimensioned and positioned to correspond to desired shape and position of the passageway or cavity in the article;
c) depositing metal on the surfaces of the beads to form the metallic foam article;
d) removing said shaping element from said metallic foam article.

Constructing a pre-cursor comprising a plurality of beads secured to a fibre may be carried out as described in GB201200034.5. For example, the beads may be formed and subsequently threaded onto the fibre or they may be formed with the fibre in situ e.g. using a mould assembly or a rotating mould assembly, and subsequently hardened e.g. by curing.

The fibres may comprise reinforcing fibres such as fibres formed of carbon, glass, aramid, metal, silicon carbide, boron or neoprene. Carbon fibres may be glass coated or may be carbon fibre tow. The fibre tows may be preimpregnated and include a thermoplastic or additional filler material such as micro- or nano-beads of an elastomeric polymer such as polychloroprene.

A conductive coating (e.g. carbon or copper paste/dust coating) may be applied to the beads e.g. by spraying, dipping or electrostatic coating.

The precursors may be arranged so that the beads form a hexagonal close-packed array or, if beads of different sizes are used, a pseudo-random, interlocking arrangement, around the shaping element.

The shaping element and or the processing vessel may comprise a support element for supporting the shaping element within the processing vessel. For example, the shaping element may be supported within the processing vessel by a projection extending from the processing vessel wall. Additionally/alternatively, the shaping element may comprise an extending wire which may be affixed to the processing vessel. The extending wire may extend through the shaping element. The extending wire may extend through the wall of the processing vessel. In this case, the wire extending through the wall of the processing vessel may be affixed to a retention member e.g. rod.

The shaping element may be formed of wax, polystyrene, or ceramic material.

The shaping element may be pre-metallised on its outer surface. Alternatively, the shaping element may be coated with a conductive material e.g. carbon or copper paste or dust.

Metal (e.g. nickel, steel, copper or aluminium) is deposited on the surface of the pre-cursor beads as described in GB201200034.5.

For beads that have a conductive coating, electroplating such as that described in U.S. Pat. No. 3,694,325 can be used.

For beads, that have no conductive coating, the beads are coated with an organic resin that easily carbonises e.g. at a temperature below about 180° C. Carbonisation of the organic resin is followed by metallisation e.g. by electroplating as previously described.

The shaping element is removed e.g. by physically extracting the in-tact shaping element or by leaching or melting the shaping element. When the method uses a non-metallised shaping element, after removal of the shaping element, the inner walls of the passageway or cavity may be metallised. The inner surfaces may be polished to form a smooth surface e.g. using a liquid (slurry) polish.

In some embodiments, as discussed above, the metallic foam article is a blade tip for a rotary blade having at least one vortex generator comprising at least one passageway or cavity and said method comprises forming a metal foam around the shaping element, the shaping element being dimensioned and positioned to correspond to desired shape and position of the passageway or cavity in the blade tip and, subsequently removing the shaping element from said metallic foam blade tip.

In some embodiments, the method comprises:
a) constructing a pre-cursor comprising a plurality of beads secured to a fibre;
b) arranging a plurality of the precursors in a processing vessel around the shaping element, the shaping element being dimensioned and positioned to correspond to desired shape and position of the passageway or cavity in the blade tip;
c) depositing metal on the surfaces of the beads to form the metallic foam blade tip;
d) removing said shaping element from said metallic foam blade tip.

In some embodiments, the method comprises exposing the fibre of at least some of the precursors during deposition of the metal. In this way, exposed fibres can be used to integrate the metal foam article/blade tip into another component (e.g. a composite rotary blade body) by securing the fibres to or into the other component (blade body).

In some embodiments, the method further comprises infusing an insulating material into the metal foam article/blade tip. The insulating material may be a vibration insulating material (damping material) or a thermal insulation material as described above.

In some embodiments, the method further comprises providing an ablative coating as described above on the metal foam article/blade tip.

In other embodiments, the method further comprises providing a protective outer coating and/or an abrasive coating as described above on the metal foam article/blade tip.

In a sixth aspect, there is provided a method of making a rotary blade (e.g. a rotary blade for a gas turbine engine) by forming a metal foam blade tip using the method according to the fifth aspect and integrating the metal foam blade tip into the blade body of the rotary blade.

Integrating the metal foam blade tip into the blade body may comprise bonding the metal foam blade tip to the blade body (e.g. a composite blade body) using adhesive. It may additionally or alternatively comprise interweaving the exposed fibres of the metal foam blade tip (where present) with fibres in a fibre-reinforced plastic composite blade body or moulding the exposed fibres of the metal foam blade tip (where present) into the blade body.

In alternative embodiments, the blade tip and blade body may be co-moulded.

The method may further comprise providing an insulating material positioned between the blade tip and the blade body. The insulating material may be a vibration insulating material (damping material) or a thermal insulation material as described above.

In some embodiments, the method comprises providing the pressure and suction surfaces of the blade body with reinforcing facings (e.g. formed of titanium) and either partly containing the metal foam blade tip within the reinforcing facings or partly containing the reinforcing facings (e.g. the radially outermost ends) within the metal foam blade tip.

BRIEF DESCRIPTION OF THE DRAWINGS

Embodiments will now be described by way of example with reference to the accompanying drawings in which.

DETAILED DESCRIPTION OF EMBODIMENTS

Figure 1:
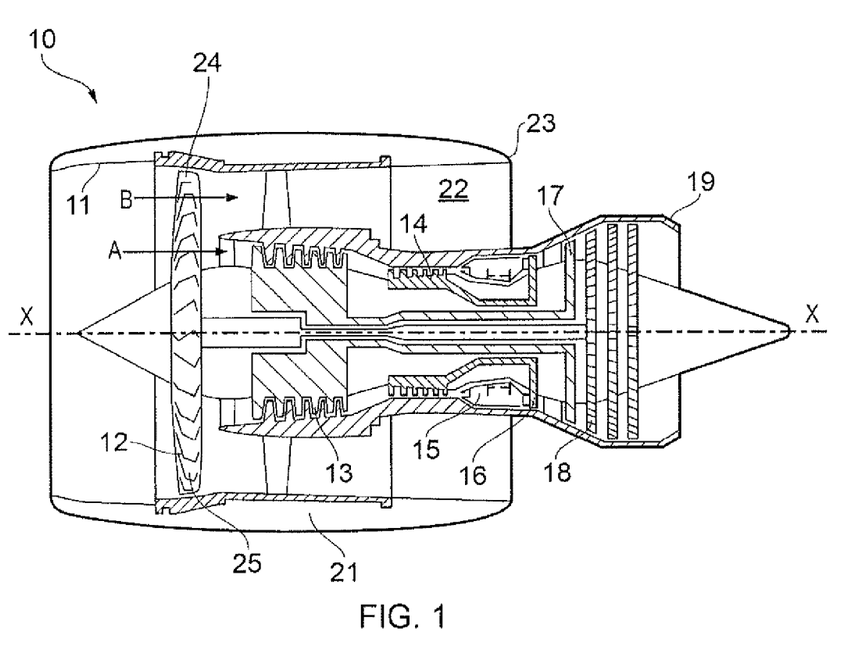
FIG. 1 shows a cross-section through a ducted fan gas turbine engine.

With reference to FIG. 1, a ducted fan gas turbine engine incorporating aspects of the disclosure is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The fan 12 comprises a plurality of fan blades 25 (formed of a fibre-reinforced plastic material such as carbon-fibre/epoxy resin composite) which are surrounded by a fan casing 24.

Each fan blade 25 has a blade tip 26, a blade body 27 and a blade root. The blade tip and blade root (not shown) are radially opposed. Each fan blade 25 further comprises a leading edge 28 and a trailing edge 29 with a (typically concave) pressure surface 30 and a (typically convex) suction surface extending between the two edges. The camber line extends from the leading edge 28 to the trailing edge 29 midway between the pressure surface 30 and suction surface.

Each blade tip 26 has a radially outer tip surface 32 and is formed of a metal foam e.g. an aluminium, stainless steel, nickel or titanium foam. The metal foam blade tip 26 comprises at least one vortex generator 33 comprising a passageway or cavity. Further details of the blade tip 26 are shown in FIGS. 2-7 discussed below.

Figure 2A:
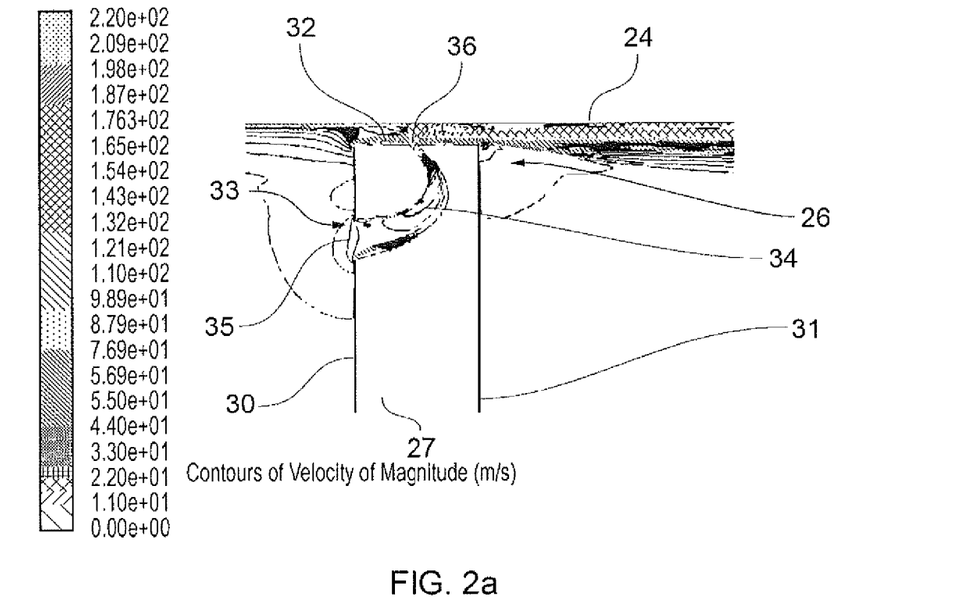
FIG. 2a shows a radial cross-section through a first embodiment of blade tip along with the contours of velocity of air flowing through a clearance gap between the blade tip and an adjacent fan casing.

FIG. 2a shows a blade tip 26 where the vortex generator 33 comprises a passageway 34 extending from an inlet 35 on the pressure face 30 of the blade tip to at least one outlet 36 on the radially outer tip surface 32 of the blade tip 26. The passageway 34 is a curved passageway that creates a funnel with the inlet 35 having a greater cross-sectional area than the outlet 36. The outlet 36 of the passageway 34 is approximately mid-way between the pressure and suction surfaces 30, 31 i.e. near the camber line of the rotary blade 25.

FIG. 2a shows the contours of velocity of the air flowing through a 4 mm clearance gap between the blade tip 26 and fan casing 24. The funnelled passageway 34 scoops and pressurises air from the inlet 35 on the pressure surface 30 into a jet of air at the outlet 36 on the radially outer tip surface 32 which is adjacent the fan casing 24. The jet of air forms an air curtain which, because of the cross flow, induces a rolling vortex. The vortex acts to seal the clearance gap between the blade tip 26 and the fan casing reducing the effective gap size to approximately 2 mm (thus increasing efficiency).

Figure 2B:
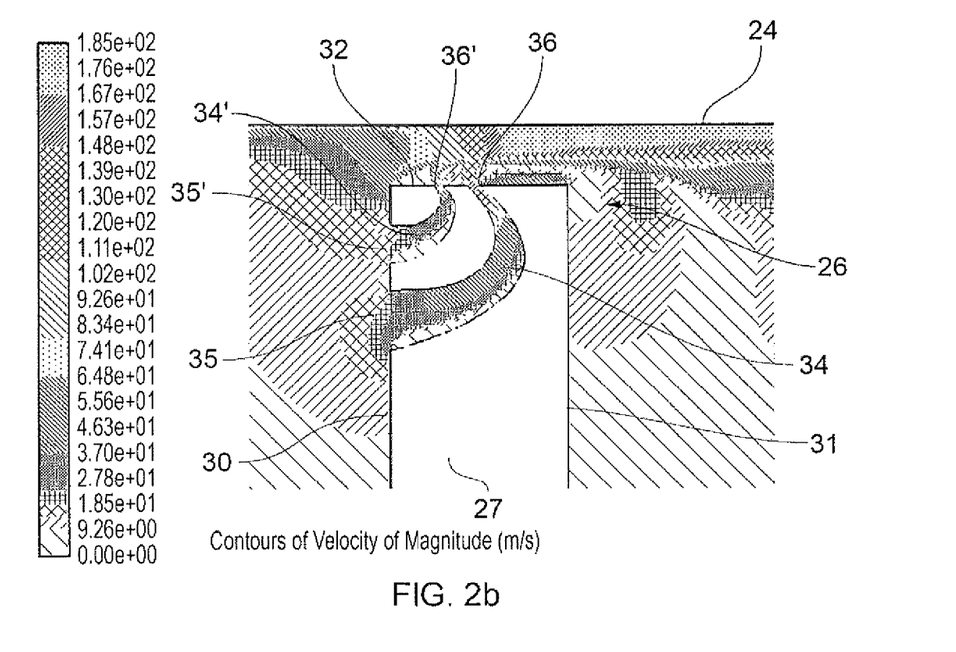
FIG. 2b shows a radial cross-section through a second embodiment of blade tip along with the contours of velocity of air flowing through a clearance gap between the blade tip and an adjacent fan casing

FIG. 2b shows a blade tip 26 where the vortex generator 33 comprises two passageways 34, 34' each extending from a respective inlet 35, 35' on the pressure face 30 of the blade tip to at least one outlet respective 36, 36' on the radially outer tip surface 32 of the blade tip 26. Each passageway 34, 34' is a curved passageway that creates a funnel with each inlet 35, 35' having a greater cross-sectional area than the respective outlet 36, 36'. One outlet 36 of the passageway 34 is approximately mid-way between the pressure and suction surfaces 30, 31 i.e. on the camber line of the rotary blade 25 whilst the other outlet 36' is proximal the pressure surface.

FIG. 2b shows the contours of velocity of the air flowing through a 6 mm clearance gap between the blade tip 26 and fan casing 24. The funnelled passageways 34, 34' scoop and pressurise air from the inlets 35, 35' on the pressure surface 30 into jets of air at the outlets 36, 36' on the radially outer tip surface 32 which is adjacent the fan casing 24. The jets of air from the outlets 36, 36' form an air curtain which, because of the cross flow, induces a rolling vortex. The vortex acts to seal the clearance gap between the blade tip 26 and the fan casing reducing the effective gap size to approximately 3.5 mm (thus increasing efficiency).

In the event of impact between the blade tip 26 and the fan casing 24 e.g. in an extreme event such as a heavy gust with cross-wind or a bird strike where the blade makes a brief excursion into the fan casing, the metal foam blade tip 26 will compress thus reducing the contact force between the blade tip 26 and the fan casing 24 which, in turn, reduces the transfer of vibrational and thermal energy from the blade tip 26 to the blade body 27. This reduces the chances of structural and/or thermal damage to the blade body 27.

Figure 3:
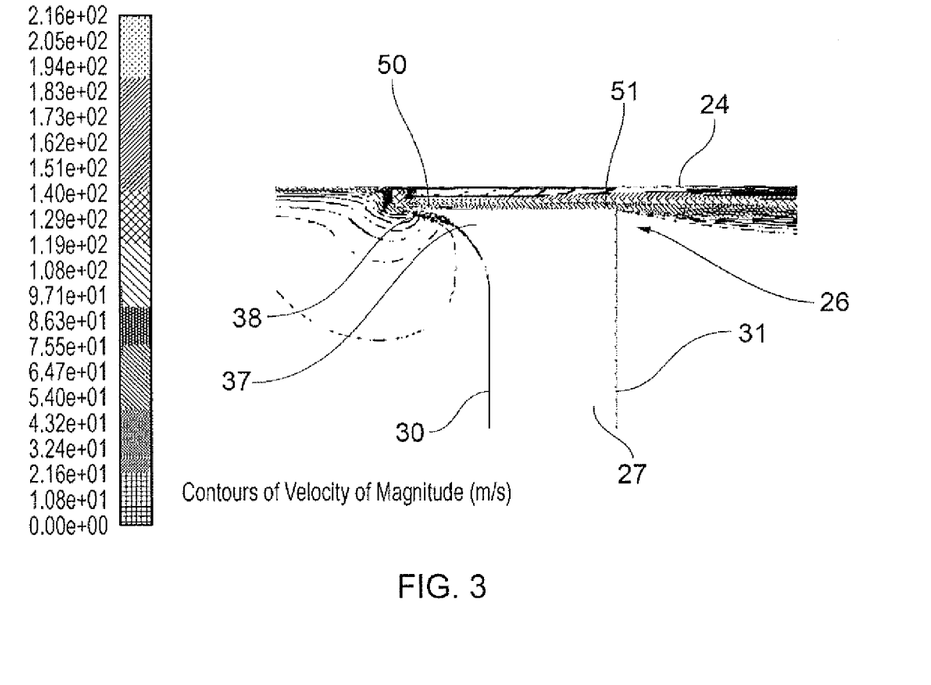
FIG. 3 shows a radial cross-section through a third embodiment of blade tip along with the contours of velocity of air flowing through a clearance gap between the blade tip and an adjacent fan casing.
Figures 4A, 4B:
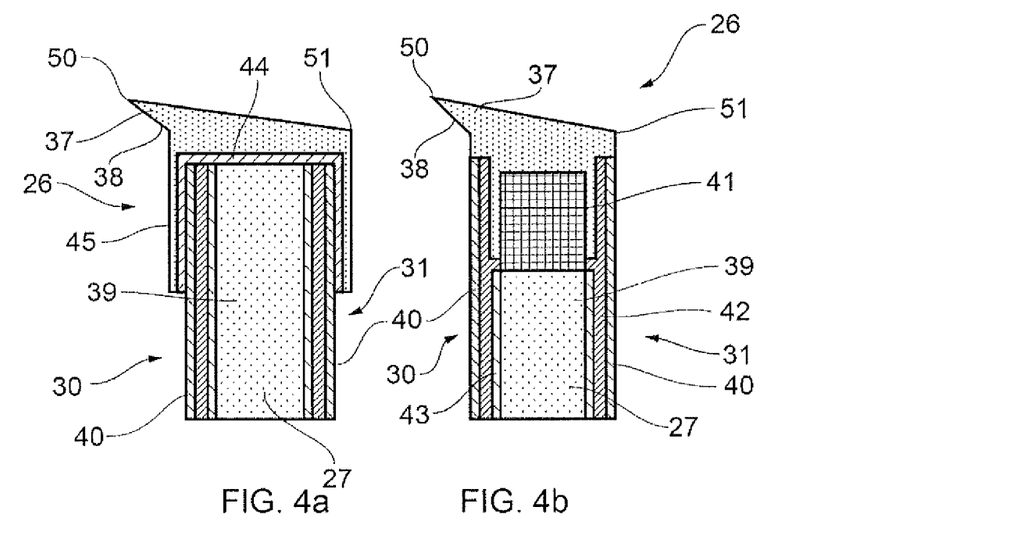
FIG. 4a shows a radial cross-section through a fourth embodiment of blade tip.
FIG. 4b shows a radial cross-section through a fifth embodiment of blade tip.

FIGS. 3, 4a and 4b show a blade tip 26 where the vortex generator is a chisel tip section having a chisel-shaped protrusion 37 extending from the pressure surface 30 of the blade tip 26. The blade tip has a linear cut-back angle extending from the pressure surface edge 50 to the suction surface edge 51. The chisel-shaped protrusion 37 has a curved lower face 38 (facing the blade root) in FIG. 3 and a linear sloped lower face 38' in FIGS. 4a and 4b.

FIG. 3 shows the contours of velocity of the air flowing through a 4 mm clearance gap between the blade tip 26 and fan casing 24. The chisel-shaped protrusion 37 creates a sealing vortex at the pressure surface edge 50 of the radially outer tip surface 32 which is adjacent the fan casing 24. The vortex acts to seal the clearance gap between the blade tip 26 and the fan casing 24 reducing the effective gap and thus increasing efficiency.

As shown in FIGS. 4a and 4b, the blade body 27 of the rotary blade is formed of a composite material containing fibres 39 (e.g. carbon fibres in an epoxy resin).

The pressure and suction surfaces 30, 31 are provided with metal (e.g. titanium) reinforcing facings 40

In the embodiment shown in FIG. 4a, the facings are bonded to the blade body 27 using a first adhesive layer 42 (e.g. AF500™ sold by the 3M Company) and a second adhesive layer 43 (e.g. AF32™ sold by the 3M Company). A damping material 44 is provided between the blade tip 26 and the blade body 27. The metal foam blade tip 26 partly contains facings 40 within a metal foam sleeve 45 which houses the radial outermost ends of blade body and facings 40.

In the embodiment shown in FIG. 4b, the metal foam blade tip 26 comprises reinforcing fibres 41 which extend from the blade tip 26 and are integrated into the blade body by moulding or by interweaving with the blade body fibres 39. The metal foam blade tip 26 is bonded to the blade body and the facings 40 using an adhesive layer 42 (e.g. AF500™ sold by the 3M Company) with the metal foam blade tip 26 partly contained within the facings 40. A second adhesive layer 43 (e.g. AF32™ sold by the 3M Company) is provided adjacent the blade body.

Figure 6:
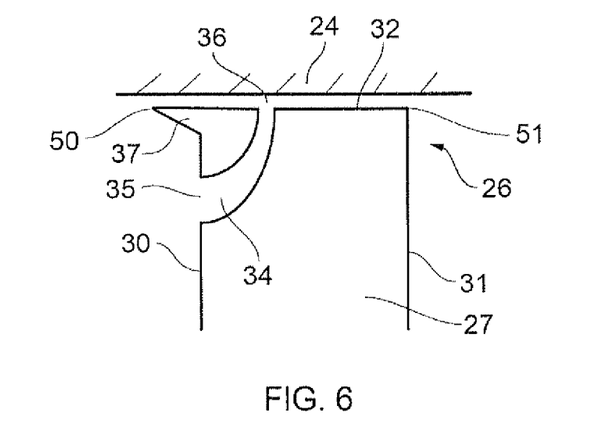
FIG. 6 shows a radial cross-section through a seventh embodiment of blade tip.

As shown in FIG. 6, the metal foam blade tip 26 can include both a passageway 34 as described with reference to FIG. 2a and a chisel-shaped protrusion 37 as described with reference to FIGS. 3, 4a and 4b.

Figure 5:
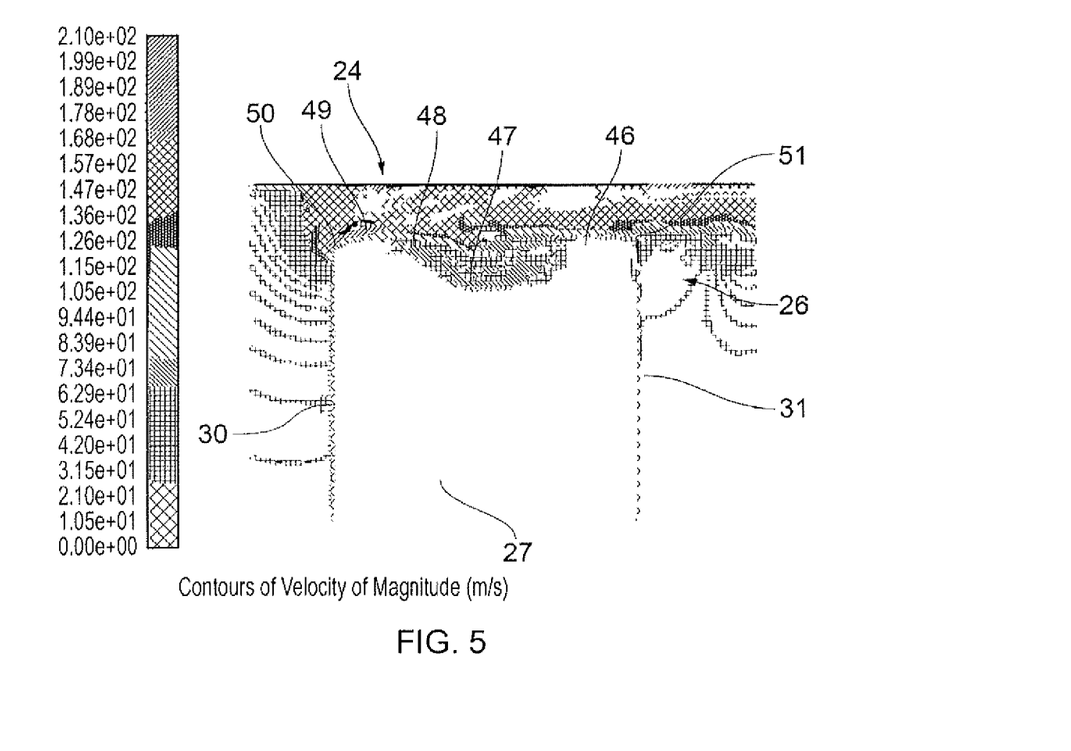
FIG. 5 shows a radial cross-section through a sixth embodiment of blade tip along with the contours of velocity of air flowing through a clearance gap between the blade tip and an adjacent fan casing.

FIG. 5 shows a blade tip 26 where the vortex generator is a squealer tip section comprising a wall 46 extending radially outwards around the perimeter of the blade tip 26 and defining a central tip cavity 47, The inner surface 48 of the perimeter wall 46 defining the central tip cavity 47 is scooped and the radially outer surface 49 of the perimeter wall towards the pressure surface 30 is convex, FIG. 5 shows the contours of velocity of the air flowing through a 4 mm clearance gap between the blade tip 26 and fan casing 24. The wall 46 and central cavity 47 create a sealing vortex towards the pressure surface edge 50 of the radially outer tip surface 32 which is adjacent the fan casing 24. The vortex acts to seal the clearance gap between the blade tip 26 and the fan casing 24 reducing the effective gap and thus increasing efficiency.

Figure 7A:
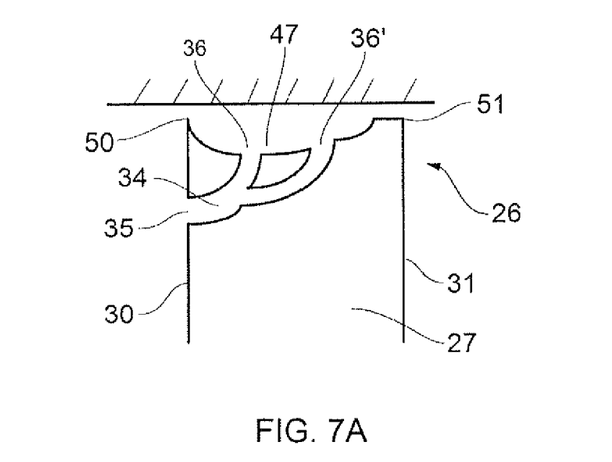
FIG. 7a shows a radial cross-section through an eighth embodiment of blade tip.
Figure 7B:
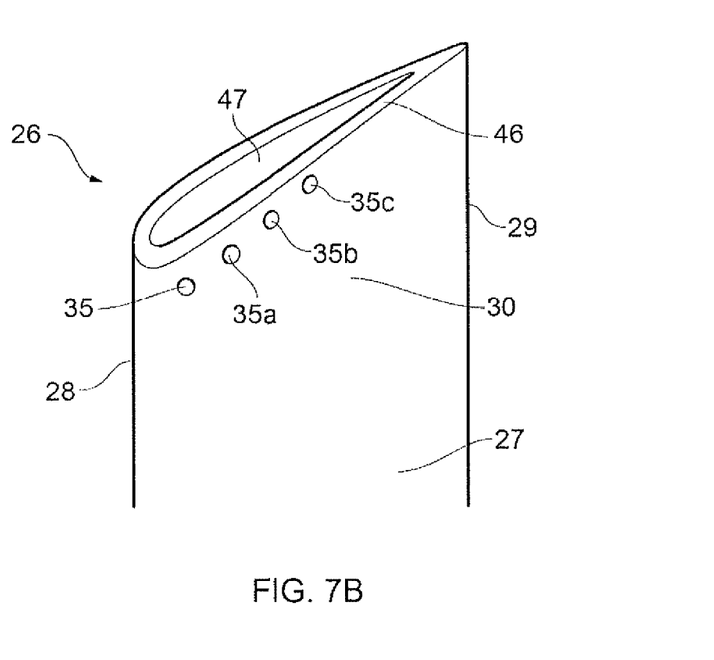
FIG. 7b shows a perspective view of a ninth embodiment of the blade tip.

As shown in FIGS. 7a and 7b, the metal foam blade tip 26 can include both a passageway 34 as described with reference to FIG. 2 and squealer tip section as described with reference to FIG. 5. In these embodiments, the vortex generator comprises a squealer tip section comprising a wall 46 extending radially outwards around the perimeter of the blade tip and defining a central tip cavity 47 with at least one passageway 34 extending from an inlet 35 on the pressure face 30 of the blade tip 26 to an outlet 36 in the central tip cavity 47.

In the embodiment shown in FIG. 7a, the passageway 34 is a branched passageway with a single inlet 35 on the pressure surface 30 of the blade tip 26 leading to two outlets 36, 36' located within the central cavity 47.

As shown in FIG. 7b, the blade tip may have a plurality of passageways 34 with a plurality of inlets 35, 35a, 35b, 35c on the pressure face 30 of the blade tip 26.

The following steps are used to form the metallic foam blade tip shown in FIGS. 2a, 2b, 5, 6, 7a and 7b.

A pre-cursor comprising a plurality of beads secured to a fibre is constructed as described in GB201200034.5. For example, the beads may be formed and subsequently threaded onto the fibre or they may be formed with the fibre in situ e.g. using a mould assembly or a rotating mould assembly, and subsequently hardened e.g. by curing.

The fibres may comprise reinforcing fibres such as fibres formed of carbon, glass, aramid, metal, silicon carbide, boron or neoprene. Carbon fibres may be glass coated or may be carbon fibre tow.

A conductive coating (e.g. carbon or copper paste/dust coating) is applied to the beads e.g. by spraying, dipping or electrostatic coating.

A plurality of the precursors is arranged in a processing vessel around a shaping element. The shaping element is formed of wax, polystyrene, or ceramic material.

The processing vessel is shaped and dimensioned to match the shape and dimension of the blade tip 26.

The processing vessel comprises a projection extending from the processing vessel wall which locates the shaping element in the correct position within the processing vessel. The shaping element includes a wire which extends through the centre of the shaping element and protrudes from the shaping element. The protruding wire passes through a hole in the wall of the processing vessel (the hole being sealed using silicone gel) and is affixed to a rod which holds the shaping element in place within the processing vessel.

The shaping element is pre-metallised on its outer surface or coated with a conductive material e.g. carbon or copper paste or dust, and is dimensioned and positioned to correspond to desired shape and position of the passageway 34 in the blade tip 26 or is dimensioned and positioned to correspond to the central tip cavity 47 in the blade tip 26.

The precursors are arranged within the processing vessel so that the beads form a hexagonal close-packed array.

Metal (e.g. nickel, aluminium, titanium, nickel, steel or other metal) is deposited on the surface of the pre-cursor beads using electroplating as described in U.S. Pat. No. 3,694,325 to form a metal foam.

The shaping element is removed e.g. by physically extracting the in-tact shaping element or by leaching or melting the shaping element to leave the metal foam blade tip 26 having a passageway 34 or a cavity 47 (or both if more than one pre-form is used).

The metal foam blade tip 26 is integrated into the blade body 27 of the rotary blade 25 by bonding the metal foam blade tip 26 to the blade body using adhesive layer 42 as shown in FIG. 4b. It may additionally comprise interweaving the exposed fibres 41 of the metal blade tip with the fibres 39 in the fibre-reinforced plastic composite blade body 27.

As shown in FIG. 4a, an insulating (damping) material 44 may be positioned between the blade tip 26 and the blade body 27.

Where the pressure and suction surfaces 30, 31 are provided with metal reinforcing facings 40 as shown in FIGS. 4a and 4b, the metal foam blade tip 26 may be partly contained within the facings 40 (FIG. 4b) or the metal foam blade tip 26 may partly contain the radially outermost ends of the blade body 27 and facings 40 (FIG. 4a).

While the disclosure has been described in conjunction with the exemplary embodiments described above, many equivalent modifications and variations will be apparent to those skilled in the art when given this disclosure. Accordingly, the exemplary embodiments set forth above are considered to be illustrative and not limiting. Various changes to the described embodiments may be made without departing from the spirit and scope of the disclosure.

All references referred to above are hereby incorporated by reference.

We claim:

1. A blade tip for a rotary blade, wherein the blade tip is formed of a metal foam and comprises at least one vortex generator comprising at least one passageway, such that, in use, a vortex is created between the blade tip and a casing adjacent the blade tip, wherein the vortex generator comprises a passageway extending from an inlet on a pressure face of the blade tip to at least one outlet on a radially outer surface of the blade tip, and the outlet(s) of the passageway are substantially mid-way between the pressure and suction surfaces on the camber line of the rotary blade.

2. A blade tip according to claim 1 wherein the vortex generator comprises at least one cavity in the blade tip.

3. A blade tip according to claim 1 wherein the passageway is a curved or spiral passageway.

4. A blade tip according to claim 1 wherein the passageway is funnelled with the inlet having a greater cross-sectional area than the/each outlet.

5. A blade tip according to claim 1 wherein the blade tip has a plurality of passageways.

6. A blade tip according to claim 1 wherein the vortex generator comprises a chisel tip section having a chisel or wedge-shaped protrusion extending from a pressure surface of the blade tip.

7. A blade tip according to claim 1 wherein the vortex generator comprises a squealer tip section comprising a wall extending radially outwards around the perimeter of a radially outer surface of the blade tip and defining a central tip cavity.

8. A blade tip according to claim 1 wherein the metal foam blade tip comprises reinforcing fibres.

9. A blade tip according to claim 1 wherein an insulating material is infused into the metal foam.

10. A rotary blade having a blade tip according to claim 1, the rotary blade having a blade body comprising a composite material.

11. A fan comprising a plurality of rotary blades according to claim 10.

12. A gas turbine engine comprising a fan according to claim 11.

13. A method of making a blade tip according to claim 1, said method comprising forming the metal foam around a shaping element, the shaping element being dimensioned and positioned to correspond to desired shape and position of the passageway in the blade tip, and, subsequently removing the shaping element from the blade tip.

14. A method according to claim 13 further comprising:
   a) constructing a precursor comprising a plurality of beads secured to a fibre;
   b) arranging a plurality of the precursors in a processing vessel around the shaping element, the shaping element being dimensioned and positioned to correspond to desired shape and position of the passageway in the blade tip; and
   c) depositing metal on the surfaces of the beads to form the blade tip.

15. A method according to claim 13 wherein the shaping element is removed by physically extracting the shaping element in an intact form, or by leaching or melting the shaping element.

16. A method according to claim 14 wherein the method further comprises exposing the fibre of at least some of the precursors during deposition of the metal.

17. A method according to claim 13 wherein the method further comprises infusing an insulating material into the blade tip.

18. A method of making a rotary blade comprising forming a blade tip according to claim 1 and integrating the blade tip into a blade body of the rotary blade, the blade body being a composite material.

* * * * *